(12) United States Patent
Qiu et al.

(10) Patent No.: US 10,608,298 B2
(45) Date of Patent: Mar. 31, 2020

(54) HEATING CONTROL METHOD AND HEATING CONTROL DEVICE FOR BATTERY STRUCTURE, AND BATTERY SYSTEM

(71) Applicant: CONTEMPORARY AMPEREX TECHNOLOGY CO., LIMITED, Ningde (CN)

(72) Inventors: Zhijun Qiu, Ningde (CN); Ruobo You, Ningde (CN)

(73) Assignee: CONTEMPORARY AMPEREX TECHNOLOGY CO., LIMITED, Ningde (CN)

(*) Notice: Subject to any disclaimer, the term of this patent is extended or adjusted under 35 U.S.C. 154(b) by 70 days.

(21) Appl. No.: 15/846,294

(22) Filed: Dec. 19, 2017

(65) Prior Publication Data

US 2018/0183115 A1    Jun. 28, 2018

(30) Foreign Application Priority Data

Dec. 27, 2016  (CN) .......................... 2016 1 1226193

(51) Int. Cl.
*H01M 10/615*   (2014.01)
*H01M 10/65*    (2014.01)
(Continued)

(52) U.S. Cl.
CPC ....... *H01M 10/615* (2015.04); *H01M 10/486* (2013.01); *H01M 10/617* (2015.04);
(Continued)

(58) Field of Classification Search
None
See application file for complete search history.

(56) References Cited

U.S. PATENT DOCUMENTS 5,990,660 A  *  11/1999  Meissner ............... H01M 10/44
320/127
9,496,722 B2    11/2016  Yoshida et al.
(Continued)

FOREIGN PATENT DOCUMENTS

CN    101931112 A    12/2010
CN    103178314 A    6/2013
CN    103597651 A    2/2014

OTHER PUBLICATIONS

Extended European Search Report from corresponding EP Application No. 17208827.0 dated May 17, 2018.
(Continued)

*Primary Examiner* — Scott J. Chmielecki
(74) *Attorney, Agent, or Firm* — Tucker Ellis LLP

(57) ABSTRACT

The present application relates to a heating control method and a heating control device for a battery structure, and a battery system. The heating control method includes steps of: S10, detecting a temperature value T of the battery structure; S20, judging whether the temperature value T meets a first heating condition, if yes, going to step S30; S30, controlling a positive electrode terminal to be connected with a negative electrode terminal to form short circuit, so as to heat the battery structure using heat generated by a short circuit current. When the first condition is met, the positive and negative terminals are connected to form short circuit, the heat generated by the short circuit current rapidly dissipates in the battery structure, so that the battery structure can be heated rapidly, which decreases the difference between internal and external temperature of the battery structure when adopting conventional heat conduction method.

10 Claims, 5 Drawing Sheets

(51) Int. Cl.
*H01M 10/617* (2014.01)
*H01M 10/637* (2014.01)
*H01M 10/633* (2014.01)
*H01M 10/48* (2006.01)
H01M 10/6571 (2014.01)
H01M 10/6552 (2014.01)

(52) U.S. Cl.
CPC ....... *H01M 10/633* (2015.04); *H01M 10/637* (2015.04); *H01M 10/65* (2015.04); *H01M 10/6552* (2015.04); *H01M 10/6571* (2015.04)

(56) References Cited

U.S. PATENT DOCUMENTS

| | | | |
|---|---|---|---|
| 2005/0064278 A1* | 3/2005 | Fetcenko | H01M 10/345 429/50 |
| 2006/0280977 A1* | 12/2006 | Sakajo | H01M 8/04007 429/429 |
| 2012/0094152 A1* | 4/2012 | Wu | H01M 10/052 429/50 |
| 2014/0079967 A1 | 3/2014 | Kodama et al. | |
| 2014/0291410 A1* | 10/2014 | Uemura | G05D 23/1919 236/46 R |
| 2015/0010789 A1 | 1/2015 | Yagi et al. | |
| 2015/0142237 A1* | 5/2015 | Wu | B60L 1/003 701/22 |

OTHER PUBLICATIONS

Office Action from corresponding Chinese Application No. 201611226193.8 dated Sep. 21, 2018.

\* cited by examiner

HEATING CONTROL METHOD AND HEATING CONTROL DEVICE FOR BATTERY STRUCTURE, AND BATTERY SYSTEM

CROSS-REFERENCE TO RELATED APPLICATIONS

The present application claims the benefit of priority to Chinese Patent Application No. 201611226193.8, filed on Dec. 27, 2016, the content of which is incorporated herein by reference in its entirety.

TECHNICAL FIELD

The present application relates to the field of heating technologies for batteries and, specifically, relates to a heating control method and a heating control device for a battery, and a battery system.

BACKGROUND

At low temperatures, polarization and increase of internal resistance easily happen in a battery, which causes a poor discharge capacity of a battery pack at low temperatures. In addition, at low temperatures, when charging, Li precipitation reaction easily happens, which causes decrease of battery safety performance. Therefore, it is necessary to heat the battery pack at low temperatures.

In the related art, the battery pack is generally heated by an external heating device. For example, a heating film is adhered to an outer surface of the battery or the battery pack, heat generated by the heating film is conducted to the battery or the battery pack; or a water-cycling system is installed in the battery pack, water in the water-cycling system is heated, so as to heat the battery pack.

In the two above-described heating manners, the battery or the battery pack is heated in a heat conduction way, and a heating rate is low, which results in a great difference between internal temperature and external temperature of the battery after being heated.

SUMMARY

Embodiments of the present application provide a heating control method for a single battery, a heating control method for a battery pack and a battery system, which can decrease difference between internal temperature and external temperature of the battery.

A first aspect of the present application provides a heating control method for a battery structure, including steps as follows:

S10, detecting a temperature value T of the battery structure;

S20, judging whether the temperature value T meets a first heating condition, and if the temperature value T meets the first heating condition, going to step S30; and S30, controlling a positive electrode terminal of the battery structure to be connected with a negative electrode terminal of the battery structure to form a short circuit, so as to heat the battery structure using heat generated by a short circuit current.

Preferably, the first heating condition is: the temperature value T is smaller than a first predetermined temperature value $T_1$, and the first predetermined temperature value $T_1$ is smaller than an upper limit temperature value $T_0$.

Preferably, the heating control method further includes steps as follows:

S35, detecting a voltage value V of the battery structure when the positive electrode terminal is connected with the negative electrode terminal to form a short circuit;

S40, judging whether the temperature value T meets a second heating condition, and if the temperature value T meets the second heating condition, going to step S50; and S50, using an external heating device to heat the battery structure.

Preferably, the second heating condition is: the temperature value T is greater than or equal to the first predetermined temperature value $T_1$ and is smaller than the upper limit temperature value $T_0$, or the voltage value V is smaller than or equal to a predetermined voltage value $V_0$.

Preferably, the step of using an external heating device to heat the battery structure includes: heating a phase change material contacting with the battery structure, so as to heat the battery structure by the phase change material.

Preferably, after step S50, the heating control method further includes steps as follows:

S60, detecting a temperature value $T_2$ of the phase change material; and

S70, when the temperature value $T_2$ of the phase change material is greater than a phase change temperature value $T_3$ of the phase change material, or the temperature value $T_2$ of the phase change material is greater than the upper limit temperature value $T_0$, stop heating the battery structure.

A second aspect of the present application provides a heating control device, applied to any one of the heating control methods as above-described. The heating control device includes:

a first detecting unit, configured to detect a temperature value T of a battery structure;

a first judging unit, configured to judge whether the temperature value T meets a first heating condition; and a first controlling unit, configured to, when the temperature value T meets the first heating condition, control a positive electrode terminal of the battery structure to be connected with a negative electrode terminal of the battery structure to form a short circuit, so as to heat the battery structure using heat generated by a short circuit current.

Preferably, the heating control device further includes:

a second detecting unit, configured to detect a voltage value V of the battery structure when the positive electrode terminal is connected with the negative electrode terminal to form a short circuit;

a second judging unit, configured to judge whether the temperature value T meets a second heating condition; and a second controlling unit, configured to, when the temperature value T meets the second heating condition, control to use an external heating device to heat the battery structure.

Preferably, the heating control device further includes:

a third detecting unit, configured to detect a temperature value $T_2$ of a phase change material;

a third judging unit, configured to judge whether the temperature value $T_2$ of the phase change material is greater than an upper limit temperature value $T_0$ or is greater than a phase change temperature value $T_3$ of the phase change material; and a third controlling unit, configured to, when the temperature value $T_2$ of the phase change material is greater than the temperature upper limit value $T_0$ or is greater than the phase change temperature value $T_3$, control to stop heating the battery structure.

A third aspect of the present application provides a battery system. The battery system includes a battery structure, a heating assembly, and any one of the heating control devices as above-described. The heating control device is electrically connected with the heating assembly and the battery structure to form a control circuit, and the heating assembly is configured to heat the battery structure under control of the heating control device.

Preferably, the heating assembly includes a heater, and a resistance of the heater increases as a temperature of the heater increases.

Preferably, the heating assembly further includes a phase change material, the heater contacts with the phase change material, the phase change material is capable of changing phase at a phase change temperature, and heat generated by the heater is conducted to the battery structure via the phase change material.

Technical solutions of the present application can achieve the following beneficial effects:

The present application provides a heating control method of a battery structure. When the temperature value T of the battery structure meets the first heating condition, the positive electrode terminal of the battery structure and the negative electrode terminal of the battery structure are connected with each other in short circuit. At this time, the positive electrode terminal of the battery structure is connected with the negative electrode terminal of the battery structure in short circuit, which means that an positive electrode of the battery structure is connected with an negative electrode of the battery structure in short circuit, and the heat generated by the short circuit current rapidly dissipates in the battery structure, so that the battery structure can be heated rapidly, which decreases the difference between internal temperature and external temperature of the battery structure when adopting conventional heat conduction method.

It should be noted that, the general description as above and the detailed description hereinafter are exemplary, and they do not limit the present application.

The above-mentioned drawings are incorporated into the specification and constitute a part of the specification, which show embodiments according to the present application, and are used for illustrating principles of the present application.

DESCRIPTION OF EMBODIMENTS

The present application will be described in detail with reference to the accompanying drawings and embodiments thereof.

The present application provides a heating control method for a battery structure. The battery structure may include one single battery, or may include a plurality of single batteries, such as a battery module.

Figure 1:
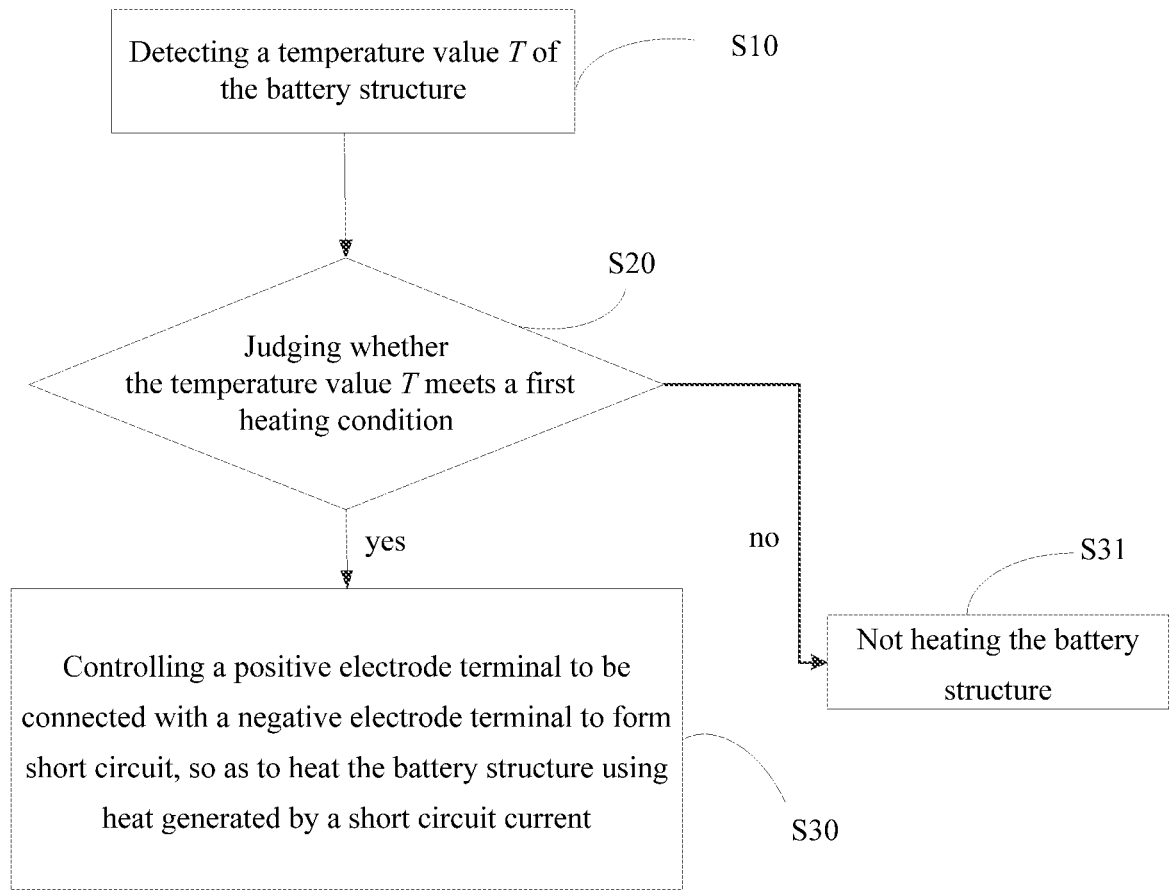
FIG. 1 is a flowchart of a heating control method according to a first embodiment of the present application.

As shown in FIG. 1, the heating control method includes steps as follows:

S10, detecting a temperature value T of a battery structure;

S20, judging whether the temperature value T meets a first heating condition, if the temperature value T meets the first heating condition, going to step S30, otherwise, going to step S31;

S30, controlling a positive electrode terminal of the battery structure to be connected with a negative electrode terminal of the battery structure in short circuit, for heating the battery structure by heat generated by a short circuit current; and S31, not heating the battery structure.

Figure 4:
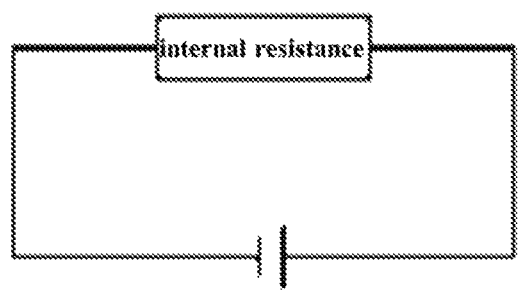
FIG. 4 is an equivalent circuit diagram of a battery structure being in a short circuit state according to an embodiment of the present application.

According to the above-described method, when the temperature value T of the battery structure meets the first heating condition, the positive electrode terminal and the negative electrode terminal of the battery structure are controlled to be connected with each other in short circuit. An equivalent circuit diagram of the battery structure is shown in FIG. 4. At this time, the positive electrode terminal of the battery structure is connected with the negative electrode terminal of the battery structure in short circuit, which means that an positive electrode of the battery structure is connected with an negative electrode of the battery structure in short circuit, and the heat generated by the short circuit current rapidly dissipates in the battery structure, so that the battery structure can be heated rapidly, which decreases the difference between internal temperature and external temperature of the battery structure compared with when adopting conventional heat conduction method.

Figure 5:
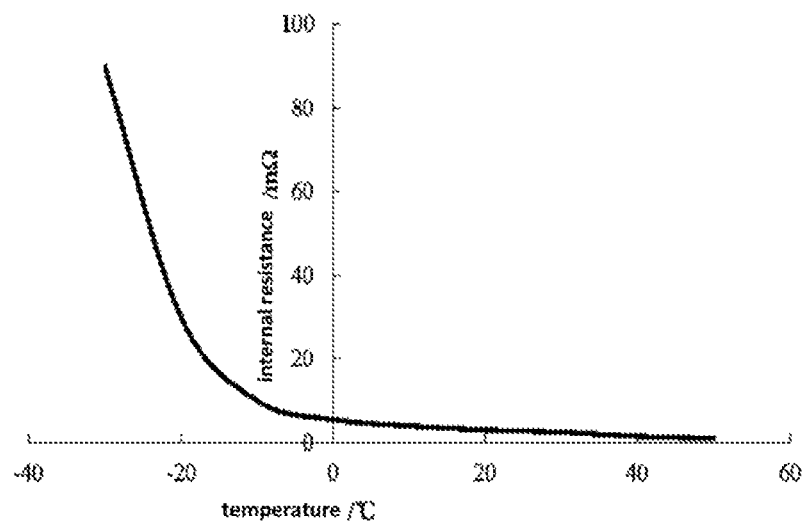
FIG. 5 is graph showing relation between internal resistance and temperature of a battery structure according to an embodiment of the present application.

The first heating condition can be set according to practical needs, in an embodiment, the first heating condition is: the temperature value T is smaller than a first predetermined temperature value $T_1$, and the first predetermined temperature value $T_1$ is smaller than an upper limit temperature value $T_0$. The upper limit temperature value $T_0$ refers to a maximum temperature value to which it is allowable for heating the battery structure. As shown in FIG. 5, the internal resistance of the battery structure decreases significantly with the temperature increasing, which may cause damage to the battery structure due to an excessive short circuit current. Therefore, setting the first predetermined temperature value $T_1$ to be smaller than the upper limit temperature value $T_0$ will decrease a damage risk of the battery structure and improve the safety performance of the battery structure.

It should be noted that the temperature value T of the battery structure can be a temperature value of the terminals or of a surface of the battery structure.

Additionally, when the battery structure includes a plurality of single batteries, the temperature value T of only several single batteries, rather than all of the single batteries, of the battery structure are needed to be detected. For example, when multiple single batteries are stacked up along the thickness direction, the temperature value T of only two outermost single batteries are detected when detecting the temperature value T, and if the temperature value T of one of the two outermost single batteries meets the first heating condition, step S30 can be performed, otherwise, step S31 can be performed (i.e., not heating the battery structure).

Figure 2:
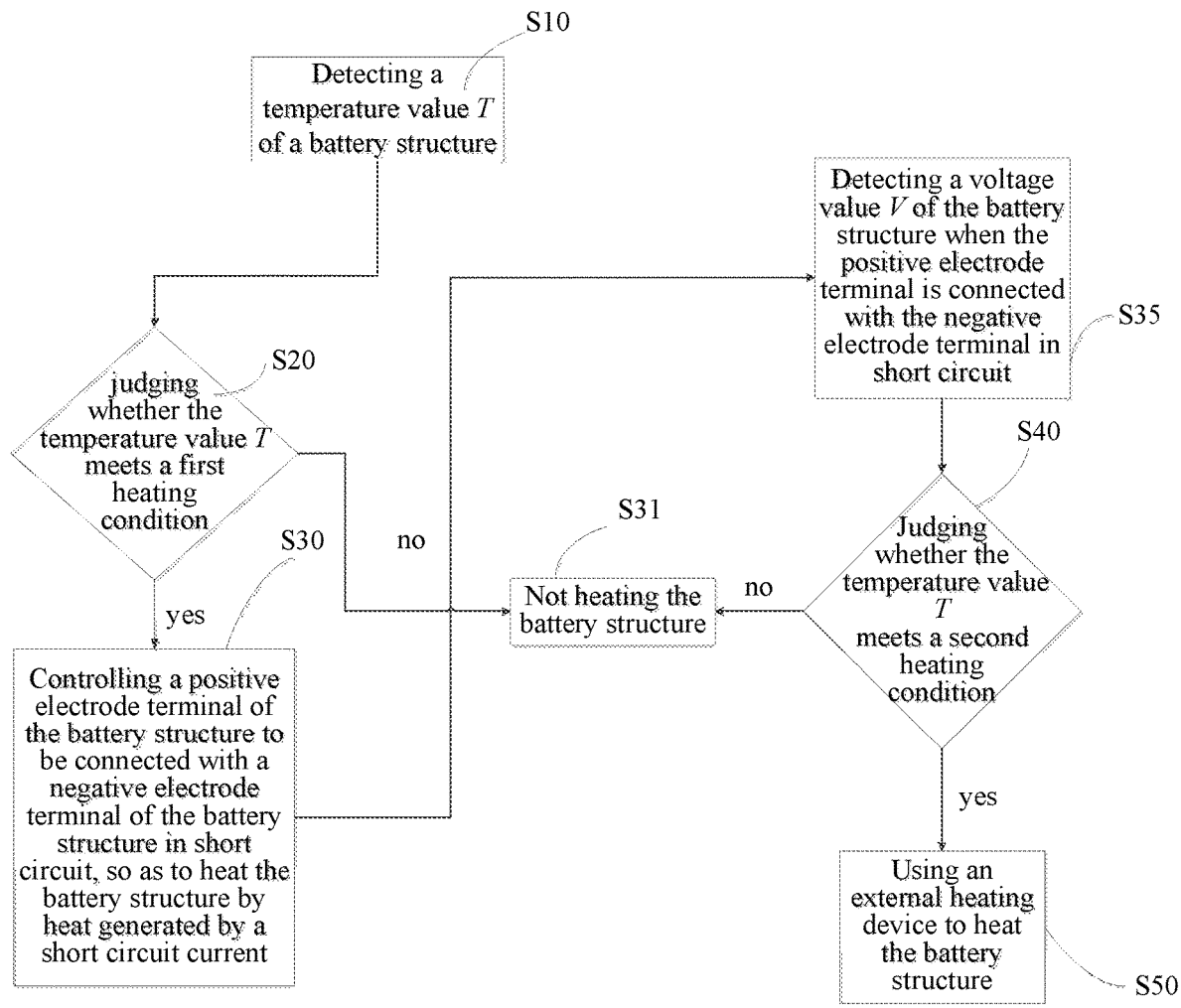
FIG. 2 is a flowchart of a heating control method according to a second embodiment of the present application.

Furthermore, for decreasing a risk of the battery structure when the positive electrode terminal is connected with the negative electrode terminal in short circuit, as shown in FIG. 2, the heating control method further includes steps as follows:

S35, detecting a voltage value V of the battery structure when the positive electrode terminal is connected with the negative electrode terminal in short circuit;

S40, judging whether the temperature value T meets a second heating condition, and if the temperature value T meets the second heating condition, going to step S50, otherwise, going to step S31; and S50, using an external heating device to heat the battery structure.

When the positive electrode terminal is connected with the negative electrode terminal in short circuit, the short circuit current heats the battery structure continuously, and the temperature of the battery structure rises up continuously. If positive electrode terminal and the negative electrode terminal are kept in short circuit, a damage risk of the battery structure may increase. Therefore, in the present solution, the second heating condition is set, and when the second heating condition is met, an external heating device is used to heat the battery structure for decreasing the damage risk.

Similarly, the second heating condition can be set according to practical needs. In an embodiment, the second heating condition is: the temperature value T is greater than or equal to the first predetermined temperature value $T_1$ and is smaller than the upper limit temperature value $T_0$, or the voltage value V is smaller than or equal to a predetermined voltage value $V_0$. After setting as above, the second heating condition includes two judging conditions with a relation of 'logic or', that is, if one of the two judging conditions is met, an external heating device can be used to heat the battery structure, so as to make the heating method more flexible and safe. It should be noted that the predetermined voltage value $V_0$ is smaller than a cutoff voltage value of the battery structure.

In a common situation, when an external heating device is used for heating, the external heater directly contacts with the battery structure to conduct heat to the battery structure. In the present application, in order to avoid overheating, preferably, the external heating device used for heating the battery structure specifically adopts a manner of: heating a phase change material contacting with the battery structure, so as to heat the battery structure by the phase change material. When heating the phase change material, a temperature of the phase change material increases, and until the temperature rises up to a phase change temperature, the temperature of the phase change material is kept at the phase change temperature, so that overheating is avoided, and thus the damage risk of the battery structure is decreased.

Figure 3:
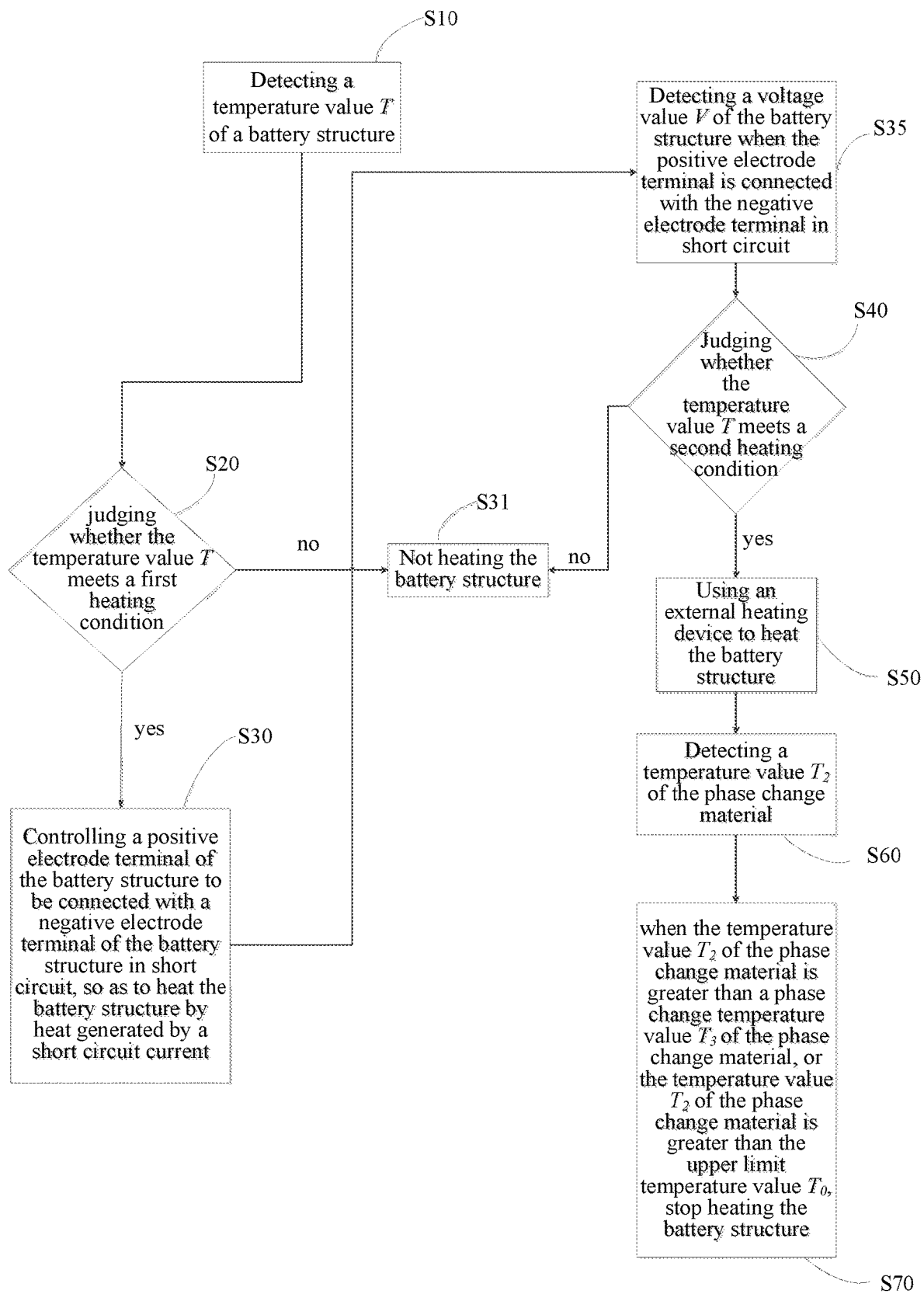
FIG. 3 is a flowchart of a heating control method according to a third embodiment of the present application.

Therefore, as shown in FIG. 3, after step S50, the heating control method further includes steps as follows:

S60, detecting a temperature value $T_2$ of a phase change material; and

S70, when the temperature value $T_2$ of the phase change material is greater than a phase change temperature value $T_3$, or the temperature value $T_2$ is greater than the upper limit temperature value $T_0$, stop heating the battery structure.

When the temperature value T neither meets the first heating condition nor meets the second heating condition, step S31 is performed, and the battery structure is not heated.

In the present solution, when a heating power is too high, and the temperature value $T_2$ of the phase change material rises to the phase change temperature value $T_3$, phase of the phase change material may change while the temperature value $T_2$ of the phase change material remains unchanged at the phase change temperature value $T_3$, so that overheating can be avoided. When the temperature value $T_2$ of the phase change material is greater than the phase change temperature value $T_3$, heating of the battery structure is stopped. At that time, the battery structure can be heated by the heat stored in the phase change material.

A second aspect of the present application is to provide a heating control device. The heating control device is applied in the heating control method of any one of the embodiments as above-described. The heating control device includes:

a first detecting unit, configured to detect a temperature value T of a battery structure;

a first judging unit, configured to judge whether the temperature value T meets a first heating condition; and a first controlling unit, configured to, when the temperature value T meets the first heating condition, control a positive electrode terminal of the battery structure to be connected with a negative electrode terminal of the battery structure in short circuit, so as to heat the battery structure using heat generated by a short circuit current.

The heating control device is capable of controlling the positive electrode terminal of the battery structure and the negative electrode terminal of the battery structure to be connected with each other in short circuit, when the positive electrode terminal of the battery structure is connected with the negative electrode terminal of the battery structure in short circuit, which means that a positive electrode of the battery structure is connected with a negative electrode of the battery structure in short circuit, and the heat generated by the short circuit current rapidly dissipates in the battery structure, so that the battery structure can be heated rapidly, which decreases the difference between internal temperature and external temperature of the battery structure when adopting conventional heat conduction method.

The heating control device further includes:

a second detecting unit, configured to detect a voltage value V of the battery structure when the positive electrode terminal is connected with the negative electrode terminal in short circuit;

a second judging unit, configured to judge whether the temperature value T meets the second heating condition; and a second control unit, configured to, when the temperature value T meets the second heating condition, control to use an external heating device to heat the battery structure.

Furthermore, the heating control device further includes:

a third detecting unit, configured to detect a temperature value $T_2$ of a phase change material;

a third judging unit, configured to judge whether the temperature value $T_2$ of the phase change material is greater than the upper limit temperature value $T_0$ or is greater than a phase change temperature value $T_3$; and a third controlling unit, configured to, when the temperature value $T_2$ of the phase change material is greater than the phase change temperature value $T_3$ or is greater than the upper limit temperature value $T_0$, control to stop heating the battery structure.

A third aspect of the present application is to provide a battery system. The battery system includes a battery structure, a heating assembly, and a heating control device. The heating control device is electrically connected with the heating assembly and the battery structure to form a control circuit loop. The heating assembly is capable of heating the battery structure controlled by the heating control device. The heating control device is any one of the heating control devices in the above-described embodiments.

Figure 6:
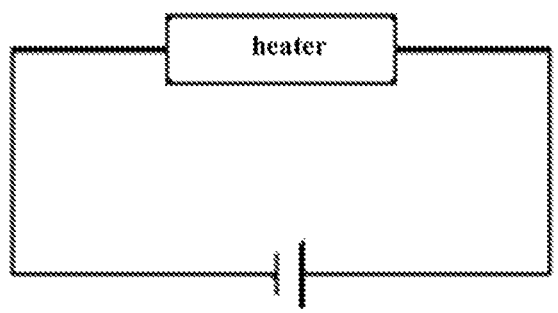
FIG. 6 is an equivalent circuit diagram of a heater according to an embodiment of the present application.

Preferably, the heating assembly includes a heater, and a resistance of the heater increases as the temperature increases. Thus, a relation between the temperature of the heater and the resistance of the heater are in conformity with a heating power needed by heating the battery structure, thereby improving the utilization rate of energy. For example, the heater can be a thermal-sensitive ceramic heater. An equivalent circuit diagram of the heater is shown in FIG. 6.

The heating assembly further includes a phase change material. The heater contacts with the phase change material. The phase change material can change phase at the phase change temperature. The heat generated by the heater is conducted to the battery structure via the phase change material. When the heat is conducted to the phase change material, the temperature of the phase change material rises up, until reaches the phase change temperature, and then is kept at the phase change temperature without rising up continuously. Therefore, overheating is avoided, and the damage risk of the battery structure is decreased.

According to an embodiment, the phase change material includes fire retardant, stabilizer, and paraffin. The fire retardant, the stabilizer, and the paraffin are dissolved and prepared to be slurry. Porous graphite is immersed into the slurry, cooled, dried, and casted to obtain the phase change material. The phase change material is not limited to the above-mentioned compositions, and can be obtained by processing other compositions.

In order to avoid the heat loss and improve the heating efficiency, preferably, the phase change material includes an accommodating cavity, and the heater is accommodated in the accommodating cavity.

It should be noted that, the heating assembly can contact with a side surface of the battery structure, or can contact with a bottom surface of the battery structure. In an embodiment, preferably, the heating assembly is placed at the bottom of the battery structure, and contacts with the bottom surface of the battery structure, so as to facilitate the arrangement of the battery structure.

Figure 7:
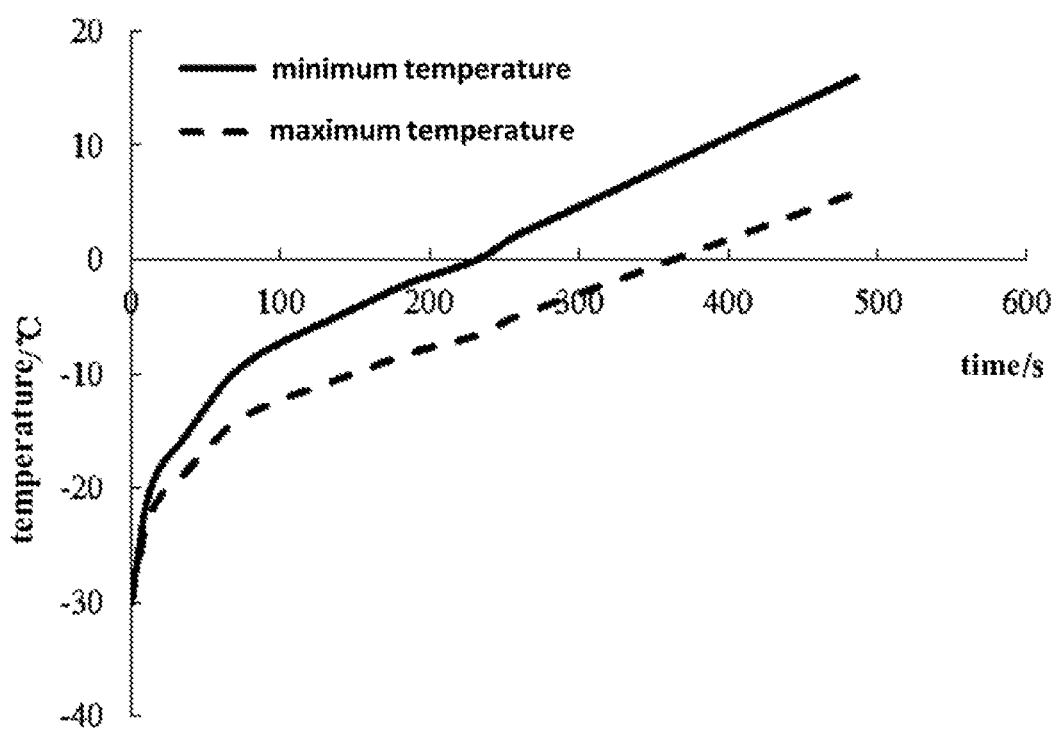
FIG. 7 is schematic diagram showing minimum temperature and maximum temperature of a battery structure when being heated according to an embodiment of the present application.
Figure 8:
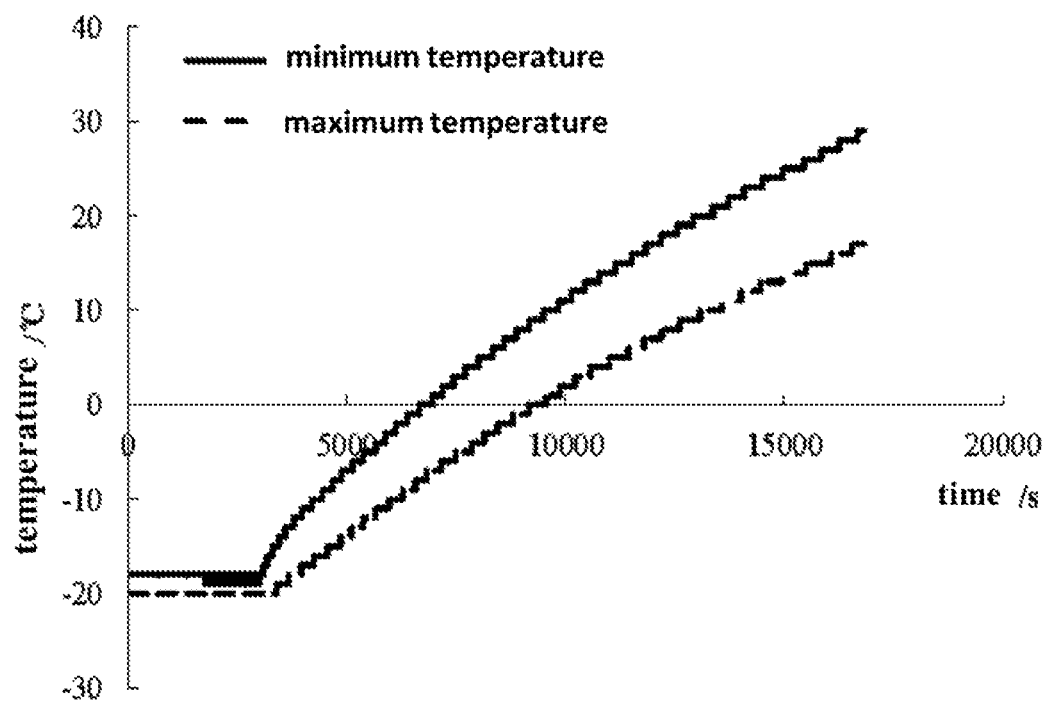
FIG. 8 is a schematic diagram showing minimum temperature and maximum temperature of a battery structure when being heated according to the prior art.

FIG. 7 is schematic diagram showing minimum temperature and maximum temperature of the battery structure when being heated according to an embodiment of the present application. As shown in FIG. 7, the mean heating rate of the battery structure is about 6° C./min. FIG. 8 is a schematic diagram showing minimum temperature and maximum temperature of a battery structure when being heated according to the prior art. As shown in FIG. 8, an average heating rate of the battery structure is about 0.2° C./min. It is clear that, the average heating rate of the battery structure is significantly improved in the embodiments of the present application.

The embodiments described above are merely preferred embodiments of the present application and they do not limit the present application. Any modification, equivalent replacement, and improvement made within the spirit and principle of the present application shall fall within the scope of the present application.

What is claimed is:

1. A heating control method for a battery structure, comprising steps as follows:

S10, detecting a temperature value T of the battery structure;

S20, judging whether the temperature value T meets a first heating condition, and if the temperature value T meets the first heating condition, going to step S30, wherein the first heating condition is: the temperature value T is smaller than a first predetermined temperature value $T_1$, and the first predetermined temperature value $T_1$ is smaller than an upper limit temperature value $T_0$;

S30, forming a short circuit between a positive electrode terminal of the battery structure and a negative electrode terminal of the battery structure, so as to heat the battery structure using heat generated by a short circuit current and decrease a difference between an internal temperature and an external temperature of the battery structure;

S35, detecting a voltage value V of the battery structure while the short circuit between the positive electrode terminal and the negative electrode terminal is in place;

S40, judging whether the temperature value T meets a second heating condition and judging whether the voltage value V meets the second heating condition, and if at least one of the temperature value T or the voltage vale V meets the second heating condition, going to step S50; and S50, activating an external heating device to heat the battery structure.

2. The heating control method for a battery structure according to claim 1, wherein the second heating condition is: the temperature value T is greater than or equal to the first predetermined temperature value $T_1$ and is smaller than the upper limit temperature value $T_0$, or the voltage value V is smaller than or equal to a predetermined voltage value $V_0$.

3. The heating control method for a battery structure according to claim 1, wherein the step of activating an external heating device to heat the battery structure comprises: heating a phase change material with the external heating device, the phase change material contacting the battery structure, so that heat from the external heating device heats the battery structure by way of the phase change material.

4. The heating control method for a battery structure according to claim 3, after step S50, further comprising steps as follows:

S60, detecting a temperature value $T_2$ of the phase change material; and

S70, when the temperature value $T_2$ of the phase change material is greater than a phase change temperature value $T_3$ of the phase change material, or the temperature value $T_2$ of the phase change material is greater than the upper limit temperature value $T_0$, stop heating the battery structure.

5. A heating control device, comprising:

a first detecting unit, configured to detect a temperature value T of a battery structure;

a first judging unit, configured to judge whether the temperature value T meets a first heating condition, wherein the first heating condition is: the temperature value T is smaller than a first predetermined temperature value $T_1$, and the first predetermined temperature value $T_1$ is smaller than an upper limit temperature value $T_0$; and a controlling unit, programmed to, upon the temperature value T meeting the first heating condition, control formation of a short circuit between a positive electrode terminal of the battery structure and a negative electrode terminal of the battery structure, so as to heat the battery structure using heat generated by the short circuit current and decrease a difference between an internal temperature and an external temperature of the battery structure; and a second detecting unit configured to detect a voltage value V of the battery structure while the short circuit between the positive electrode terminal and the negative electrode terminal is in place; and wherein the controlling unit is further programmed to judge whether the temperature value T meets a second heating condition and judge whether the voltage value V meets the second heating condition, and if at least one of the temperature value T or the voltage vale V meets the second heating condition, activate an external heating device to heat the battery structure.

6. The heating control device according to claim 5, the battery structure being associated with the external heating device, wherein the external heating device is separated from the battery structure by a phase change material, the heating control device further programmed to:

detect a temperature value $T_2$ of the phase change material;

whether the temperature value $T_2$ of the phase change material is greater than an upper limit temperature value $T_0$ or is greater than a phase change temperature value $T_3$ of the phase change material; and upon detection that the temperature value $T_2$ of the phase change material is greater than the upper limit temperature value $T_0$ or is greater than the phase change temperature value $T_3$, deactivate the external heating device to stop heating the battery structure.

7. A battery system, comprising a battery structure, a heating assembly, and the heating control device according to claim 5, wherein the heating control device is electrically connected with the heating assembly and the battery structure to form a control circuit, and the heating assembly is configured to heat the battery structure under control of the heating control device.

8. The battery system according to claim 7, wherein the heating assembly comprises a heater, and a resistance of the heater increases as a temperature of the heater increases.

9. The battery system according to claim 8, wherein the heating assembly further comprises a phase change material, the heater contacts with the phase change material, the phase change material is capable of changing phase at a phase change temperature, and heat generated by the heater is conducted to the battery structure via the phase change material.

10. The battery system according to claim 9, wherein the phase change material comprises an accommodating cavity, and the heater is accommodated in the accommodating cavity.

* * * * *